US006640017B1

(12) United States Patent
Tsai et al.

(10) Patent No.: US 6,640,017 B1
(45) Date of Patent: Oct. 28, 2003

(54) METHOD AND APPARATUS FOR ADAPTIVELY SHARPENING AN IMAGE

(75) Inventors: Ping-Sing Tsai, Gilbert, AZ (US); Yap-Peng Tan, Chandler, AZ (US); Tinku Acharya, Tempe, AZ (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/320,192

(22) Filed: May 26, 1999

(51) Int. Cl.⁷ .................................................. G06K 9/00
(52) U.S. Cl. ........................ 382/266; 382/199; 382/200
(58) Field of Search ............................... 382/260–269, 382/199–200

(56) References Cited

U.S. PATENT DOCUMENTS

| | | | |
|---|---|---|---|
| 5,396,285 A | * 3/1995 | Hedberg et al. | 348/163 |
| 5,602,934 A | * 2/1997 | Li et al. | 382/128 |
| 5,875,122 A | 2/1999 | Acharya | 364/726.05 |
| 6,078,686 A | 6/2000 | Kim | |
| 6,097,847 A | * 8/2000 | Inoue | 382/266 |

OTHER PUBLICATIONS

U.S. patent application No. 08/986,461, filed Feb. 23, 1998, entitled "A New Perceptual Thresholding for Gradient-Based Local Edge Detection," currently pending.
U.S. patent application No. 09/151,555, filed Sep. 11, 1998, entitled "Method and System for Video Frame Enhancement Using Edge Detection", currently pending.
Jain, Anil; "Fundamentals of Digital Image Processing," Prentice Hall, pp. 249–251 and 347–355.

* cited by examiner

*Primary Examiner*—Thomas D. Lee
*Assistant Examiner*—Stephen Brinich
(74) *Attorney, Agent, or Firm*—Sharon Wong (57) ABSTRACT

Briefly, in accordance with one embodiment of the invention, a method of sharpening an image includes the following. A crispening parameter is adaptively computed for a captured image based, at least in part, on a measure of the edges and brightness of the captured image. A kernel is applied to the captured image using the adaptively computed crispening parameter.

32 Claims, 6 Drawing Sheets

α = alpha

| 0 | -α/4 | 0 |
|---|---|---|
| -α/4 | 1 + α | -α/4 |
| 0 | -α/4 | 0 |

α = alpha

| -1/9 | -1/9 | -1/9 |
|------|------|------|
| -1/9 | α/9  | -1/9 |
| -1/9 | -1/9 | -1/9 |

FIG. 3

|   | α =1.0 PSNR | α = [E(l), L(l)] | | manual select α |
|---|---|---|---|---|
|   |   | α | PSNR |   |
| A | 29.75 | 0.82 | 31.38 | 1.0 |
| B | 38.79 | 0.62 | 42.47 | 0.5 |
| C | 32.78 | 0.55 | 37.65 | 0.5 |
| D | 39.11 | 0.71 | 41.77 | 0.75 |

METHOD AND APPARATUS FOR ADAPTIVELY SHARPENING AN IMAGE

BACKGROUND

1. Field

The present invention relates to sharpening an image and, more particularly, to adaptively sharpening an image.

2. Background Information

In digital imaging systems, image sharpening, sometimes referred to as "crispening," is employed to enhance the image by removing the blurring effect introduced, typically, by different signal processing and/or optical filtering operations. A variety of "sharpening kernels" are typically employed in this process. Usually this involves applying a convolution of the sharpening kernel with the blurred image. One approach is to apply a fixed kernel to sharpen an image or set of images. Another approach is to allow the sharpness to be modified based on human judgement. For example, the Photoshop® software product available from Adobe Systems, Inc., employs this approach. However, a fixed kernel does not produce good results in some situations, such as where the image characteristics are varying, and manual adjustment is not practical in some situations, such as where video is being employed. A need, therefore, exists for a process or technique that at least in part addresses the foregoing shortcomings.

SUMMARY

Briefly, in accordance with one embodiment of the invention, a method of sharpening an image includes the following. A crispening parameter is adaptively computed for a captured image based, at least in part, on a measure of the edges and brightness of the captured image. A kernel is applied to the captured image using the adaptively computed crispening parameter.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

As previously described, typically, image sharpening is employed to enhance an image by removing a blurring effect that may be introduced by different types of signal processing and/or optical filtering operations. A variety of kernels may be employed to accomplish this result, sometimes referred to as sharpening kernels, depending on the impact of the kernel on images to which it is applied. Typically, this process involves applying a convolution of the kernel with the image, such as a blurred image. Typically, the kernel is applied on a pixel-by-pixel basis. Of course, the invention is not limited in scope to an image having a particular size or resolution. Likewise, the invention is not limited in scope to any particular spatial coding or spatial color coding technique. For example, the well-known $YC_rC_b$ or RGB color space formats, just to provide two examples, may be employed, although a variety of different formats are frequently employed, and the invention is not restricted in scope to any particular color space format. In the former color space format, Y comprises the luminance component, and $C_r$ and $C_b$ comprise the chrominance components. Nonetheless, as previously described, in order to appear visually pleasing, it may be desirable not to apply a fixed kernel to different images, especially where a variety of image types, classes, or categories are being processed, and the images, therefore, have different characteristics. Likewise, employing human judgement to adjust the sharpness of an image or series of images is frequently not practical or desirable. One situation in which this is a particular challenge is in real-time image processing.

Figure 1:
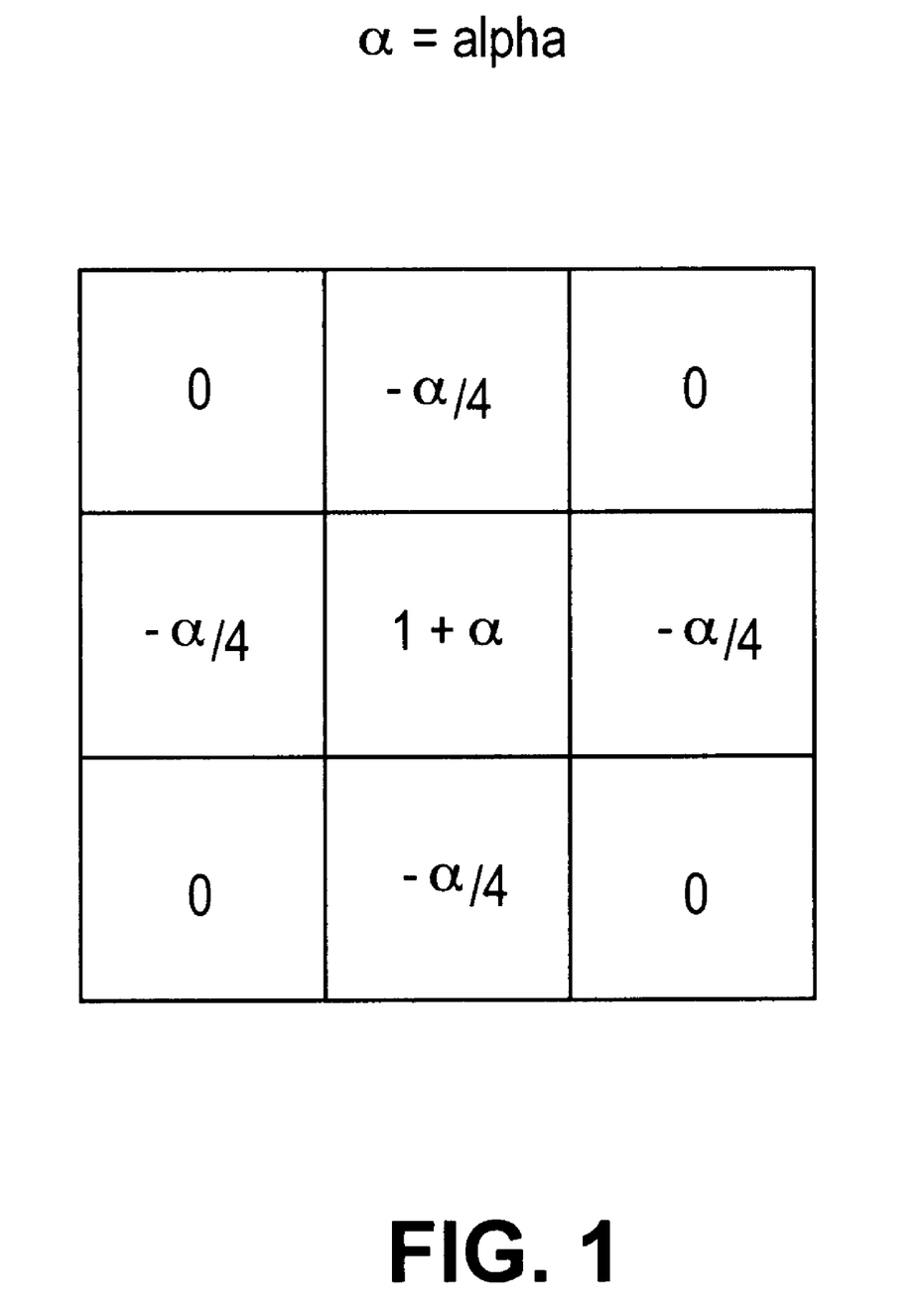
FIG. 1 is a table illustrating a commonly used kernel, such as may be employed in an embodiment in accordance with the present invention.

FIG. 1 is a diagram illustrating a commonly employed sharpening kernel. This is referred to as a sharpening kernel because the greater the value of "alpha" ($\alpha$), the more the kernel sharpens the image. Therefore, the lower the value of alpha, the less sharp the kernel makes the image. Therefore, the parameter "alpha" may be adjusted to control or adjust the sharpness of the resulting image. In this context, this is referred to as a "crispening parameter." In one approach, this crispening parameter, alpha in this particular embodiment, may be tuned based, at least in part, on the content of the image. More particularly, an adaptive method or process may be employed to determine or compute the crispening parameter based, at least in part, upon the captured image, in this case based, at least in part, on a measure of the edges and the brightness of the captured image. In a particular embodiment, the crispening parameter may be computed based, at least in part, on a measure of the strength of the edges and the degree of brightness of the captured image. In this context, the strength of the edges refers to the magnitude and the rate of change from one luminance level to another as one moves from pixel-to-pixel, measured for the overall image or a portion thereof. Likewise, in this context, the degree of brightness refers to the overall intensity of the image or a portion thereof.

This relationship may be expressed by the following equation:

$$\text{Alpha} = F[E(I), L(I)] \tag{1}$$

where F is a defined function of E and L, and E is a measure of the strength of the edges of an image I and L is a measure of the degree of brightness of the image I. This relationship is based, at least in part, on the observation that a greater amount of sharpening may be applied to a brighter image. More specifically, sharpening an image typically has the effect of amplifying the noise in the image. However, where the image is brighter, an increase in noise is less perceived than for a darker image. Therefore, the content of a brighter image may be sharpened to a greater extent without a significant increase in the perceived noise in comparison with a darker image. Likewise, if the image has less "strong" edges, then it is probably more desirable to sharpen it to strengthen the edges, in contrast to where the image already has strong edges. If an image already has strong edges, then sharpening it may produce edge artifacts that may result from applying the kernel to a "strong" or sharply contrasting edge. Therefore, an image with less strong edges can tolerate more sharpening without producing a significant amount of perceivable edge artifacts.

As previously indicated, one situation in which this approach may be desirable is in real-time image processing applications, such as video applications. For example, in low-bit rate video coding and/or decoding, although the invention is not limited in scope in this respect, compression and decompression of an image typically results in the visibility of coding artifacts. The coding is employed in order to transmit the image or sequence of images over a limited bandwidth communications channel, although, again, the invention is not limited in scope in this respect. For example, another situation in which sharpening may be desirable is with use of a still image digital camera. Typically, such cameras employ anti-aliasing filters for the camera sensor; however, these filters may introducing blurring that a sharpening filter may be employed to reduce. Likewise, encoding and/or compression may also be employed in other situations, such as to reduce the amount of storage for an image, etc. Nonetheless, various processing techniques, such as image sharpening, may be employed in order to address the blurring that may result, for example, either due to the compression/decompression of the image or due to the filtering applied to the image to remove artifacts that resulted from the coding/decoding.

Figure 2:
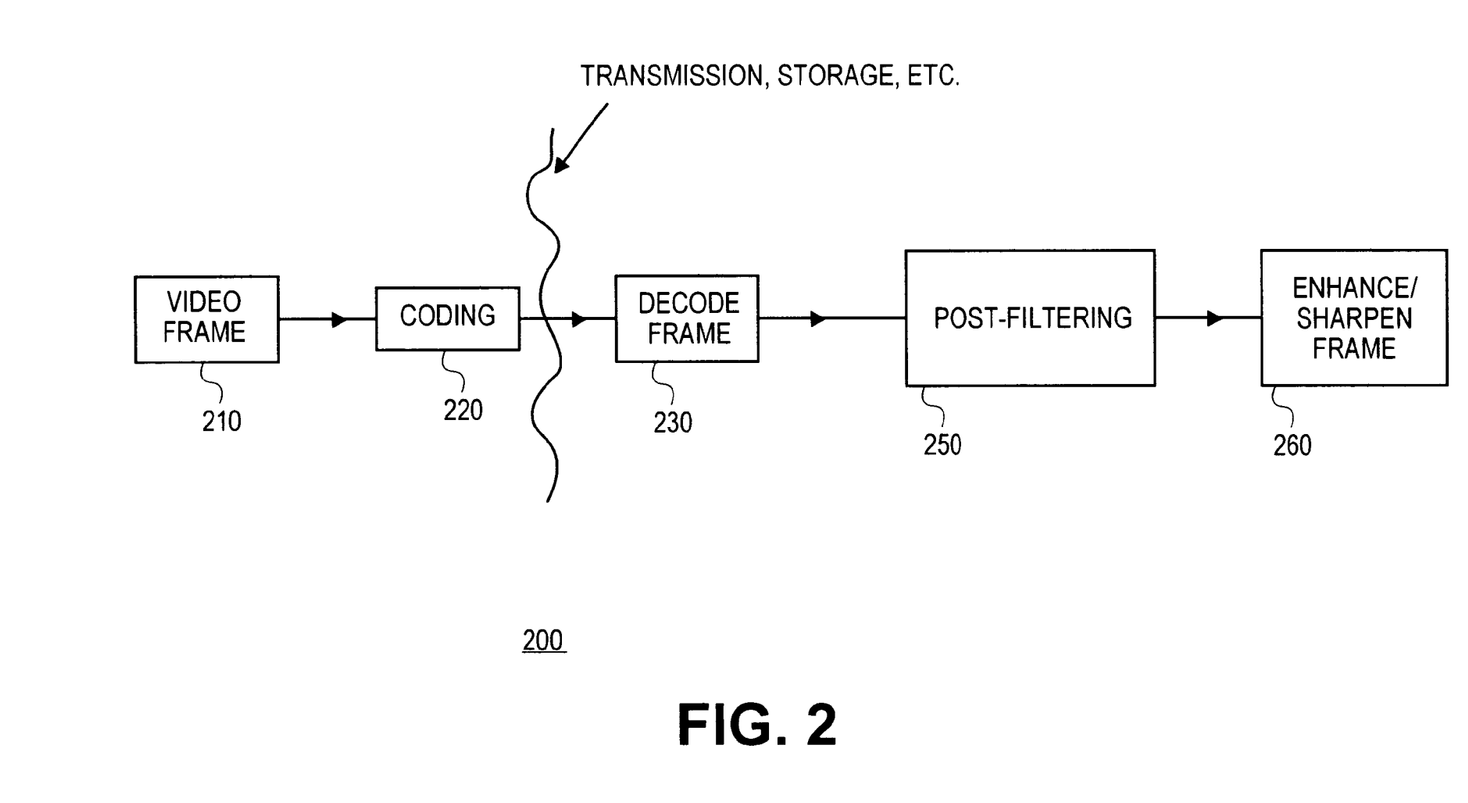
FIG. 2 is a diagram illustrating an embodiment of a system that may employ an embodiment of a method of sharpening an image in accordance with the present invention.

FIG. 2 is a block diagram illustrating one embodiment in which this type of processing may be employed. As illustrated by embodiment 200 in FIG. 2, after coding the video frame, as illustrated by block 220, the coded signals are transmitted via a communications channel (not shown); For example, this communications channel may comprise a wire line or wireless communications system, it may be broadcast, multi-cast, packet switched, or circuit switched, to provide a few examples. Then, as illustrated by block 230, in this embodiment, the video frame is decoded at the far end from the received signals. In this particular embodiment post-process filtering may be employed, for example, to remove artifacts, although the invention is not limited in scope in this respect. This is indicated in FIG. 2 by block 250. However, as a result, the image may be blurred so it may be desirable to apply a kernel to further enhance the image. As previously indicated, one difficulty is that in the case of video, scene changes may occur without advance indication, making it difficult to apply an appropriate fixed kernel to make the frames or images all or mostly all as visually appealing as desired. It will, of course, be appreciated that the invention is not limited in scope to use with any particular form of coding/compression and/or decoding/decompression. For example, MPEG4, ISO/IEC JTC1/SC29/WG11, Coding of Moving Pictures and Audio, Overview of the MPEG-4 Standard (Seoul Version), March 1999, H.263 V.2, ITU-T Recommendation H.263 Version 2 (Draft), Video Coding for Low Bit Rate Communication, Jan. 27, 1998, or anyone of a number of other approaches may be employed.

Figure 3:
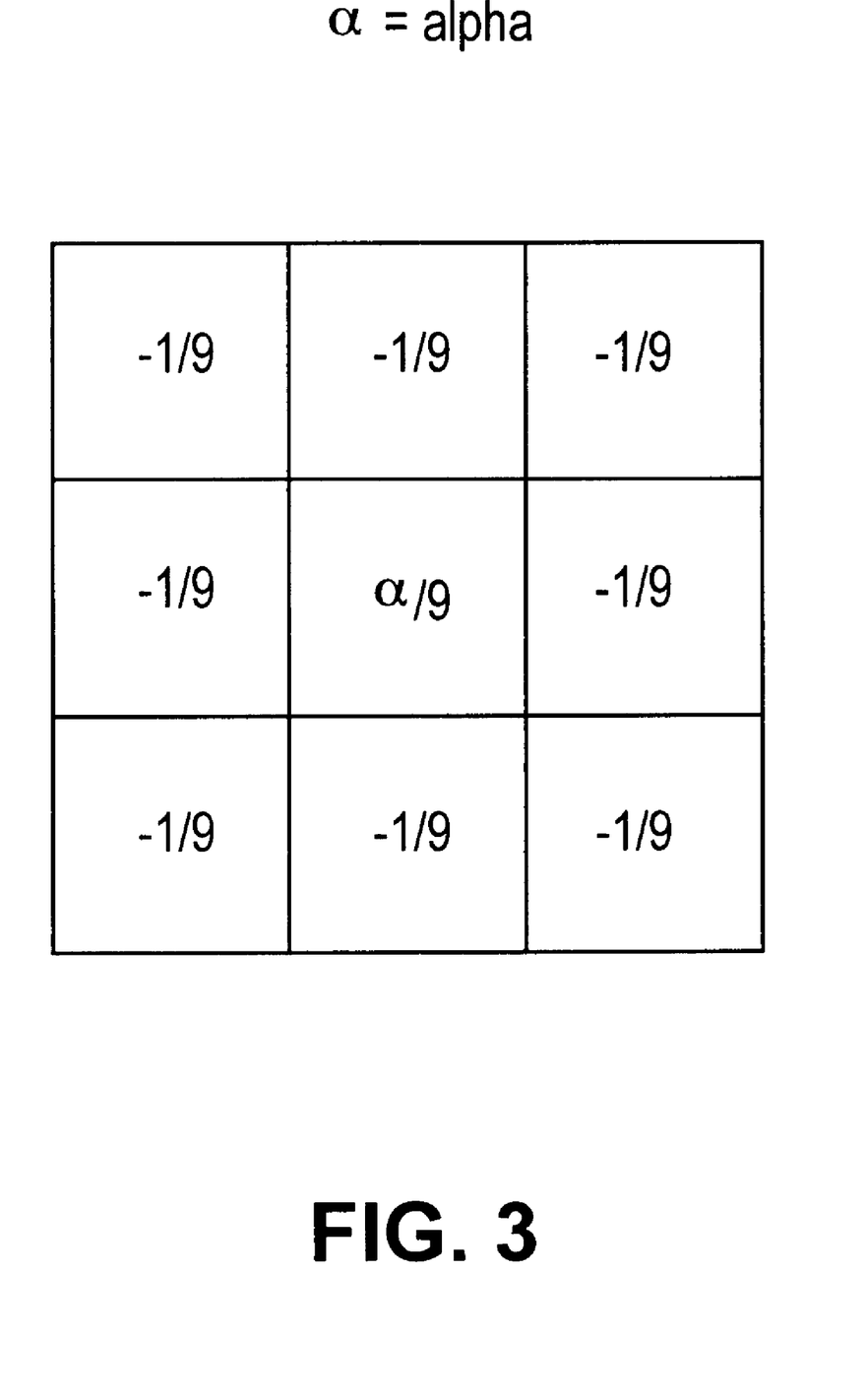
FIG. 3 is a table illustrating another commonly used kernel, such as may be employed in an embodiment in accordance with the present invention.

For video frames in the $YC_rC_b$ color space format, signal information contained in the image is divided into two chroma planes, $C_r$ and $C_b$, as well as a luminance plane, Y. As previously described, image sharpening is performed on a pixel-by-pixel basis for a given video frame in this particular embodiment, although, again, the invention is not restricted in scope in this respect. It is, of course, assumed for this particular embodiment that the video frame comprises a digital image with each pixel location having color space signal information in a binary digital signal format, although the invention is not limited in scope in this respect. In one embodiment, where a $YC_rC_b$ color space format is employed, the luminance plane signal information may be employed alone, as explained in more detail hereinafter. Of course, as previously indicated, any one of a number of color space coordinate systems may be used and the invention is not limited in scope to a particular color space coordinate system or to the use of color space at all. For example, in an alternative embodiment, the RGB color space format may be employed. In another example, gray scaling may be employed. Furthermore, any storage format may be employed to store the associated signals. Likewise, although this particular embodiment employs the kernel shown in FIG. 1, the invention is not limited in scope in this respect. A variety of well-known operators for use in image sharpening may be employed, such as, for example, those described in the textbook *Fundamentals of Digital Image Processing* by Anil Jain, published by Prentice Hall, ISBN: 0133361659. Thus, another additional example of a kernel that may be employed is provided in FIG. 3. Furthermore, the invention is not restricted in scope to applying a kernel of a specific shape. Therefore, the kernel need not be three by three, and it need not even be square or include four corners. Any one of a number of different shapes and sizes are possible.

Likewise, it is noted that, although in this particular embodiment, kernel processing is performed in a spatial domain, the invention is not limited in scope in this respect. Therefore, an adaptive sharpening process may be performed in any suitable domain desired, such as the fourier transform, discrete cosine transform, or wavelet transform domain. It is, likewise, noted that any one of a number of coding or compression schemes may also be employed to compress the frame or image. For example, a lossy or lossless compression scheme may be employed. It will be appreciated that the choice of compression scheme may vary with a variety of factors, such as available bandwidth, available processing capability, etc. As one example, differential encoding, such as differential pulse code modulation (DPCM) encoding, may be employed. Again, the invention is not limited in scope to any particular coding and/or compression scheme. Furthermore, an embodiment of a method of sharpening an image in accordance with the present invention may also be employed or applied where no coding or compression has occurred. However, in this particular embodiment, once the encoded video frame has been received at the far end of the communications channel, it may be decoded to produce a representation of the original video frame. Typically, the inverse of the process performed to code or compress the video frame is performed in order to decode or decompress the video frame.

As indicated, an embodiment of a sharpening technique in accordance with the present invention may be applied to transmited video frames after being decompressed at the far end of a communications channel to enhance the received decoded video frames. Likewise, a sharpening technique in accordance with the invention may also be employed to enhanced stored video frames that have been decompressed for playback, in an alternative embodiment. In such an embodiment, of course, the coded or compressed video frame is not transmitted via a communications channel, but, nonetheless, it may be stored, such as on a hard drive or other storage medium, and then, may be read or accessed when it is desired to view the video frame or image. When it is read or accessed, the coded or compressed image is decoded or decompressed, and then may be sharpened in accordance with the present invention. The processing employed in this particular embodiment may, therefore, be substantially similar to that employed in an embodiment in which enhancement and decompression after transmission by a communications channel occurs. Likewise, many other transmission or storage embodiments that employ image sharpening other than those described are possible and within the scope of the present invention.

In accordance with yet another embodiment, rather than applying this adaptive technique to an entire image, it may be applied to selected portions of an image, such as a region or subregion of the image. Likewise, in an alternative embodiment, different kernels may be applied adaptively to different portions of the image, each kernel, however, being modified adaptively using a technique in accordance with the present invention. As just one example, as an illustration, it may be determined that certain kernels are better for sharpening high frequency images or certain kernels are better for sharpening low frequency images. Therefore, it may be desirable to subdivide an image into high and low frequency portions and apply these kernels separately to the different respective corresponding portions.

Many alternative embodiments in accordance with the present invention are possible, and the invention is not restricted in scope to any one particular embodiment. For example, embodiments may include a video or image processing system, a method of processing a video frame or an image, and a storage medium having instructions stored thereon that when executed by a system, such as a personal computer, for example, result in the execution of an embodiment of a method of processing a video frame or image in accordance with the present invention.

Figure 5:
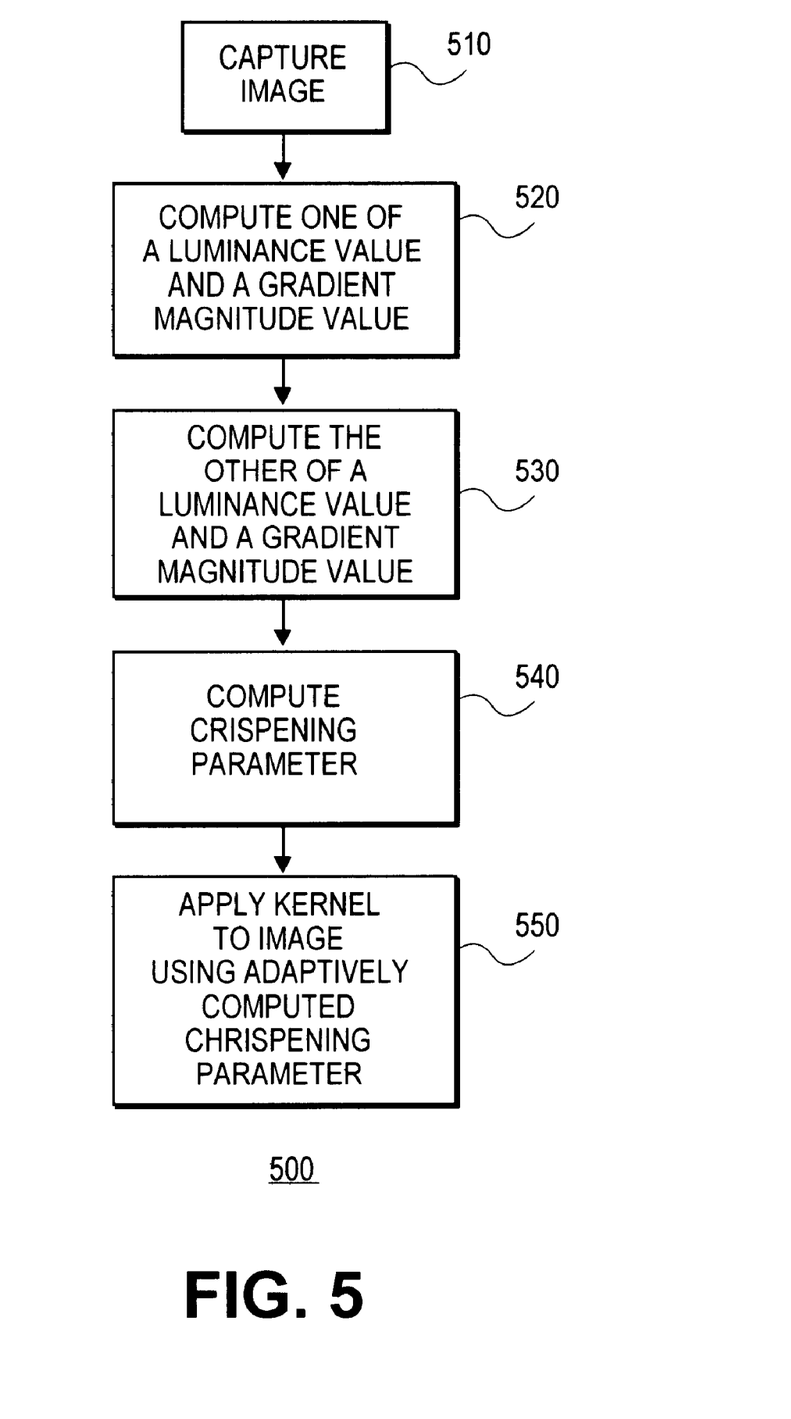
FIG. 5 is a flowchart illustrating an embodiment of a method of sharpening an image in accordance with the invention.

As previously described, the crispening parameter for a captured image, or any portion thereof, in some embodiments, is computed adaptively based, at least in part, on a measure of the edges and brightness of the captured image. It will, of course, be understood that any one of a number of different measures of the edges of an image and the brightness of an image may be employed; however, in this particular embodiment, the strength of edges is measured using the gradient magnitude for the pixels of the captured image, or a portion thereof, and the degree of brightness is measured using the luminance for the pixels of the captured image, or a portion thereof. Therefore, in this particular embodiment, adaptively computing the crisping parameter for the captured image, or a portion thereof, comprises computing a luminance value for the entire image, or for the portion of the image being sharpened, and computing a gradient magnitude value for the entire image, or for the portion of the image being sharpened. The crispening parameter is then computed, in this embodiment, based, at least in part, on the relative values of the luminance value and the gradient magnitude value that were computed. More particularly, the greater the luminance, the greater the alpha, because, as previously indicated, in brighter regions it is possible to tolerate more sharpness because the brightness makes amplification of the noise less perceptible. Likewise, the greater the strength of the edges, the lower alpha, as previously indicated. In this particular embodiment, this comprises computing the crispening parameters substantially in accordance with the following relationship:

$$\text{alpha} = 1 - [L(I)/(1 + aE(I))], \qquad (2)$$

where a is a constant factor derived from the gradient magnitude operation equal to the square root of 6. For equation (2), the gradient magnitude was determined using the well-known Prewitt operator, as described, for example, in the aforementioned text *Fundamentals of Digital Image Processing*, although any gradient operator or difference operator may be employed to measure the edges in the image. Of course, it may be desirable to modify equation (2) above to reflect the different gradient where that equation or a variant thereof is being employed. One advantage of employing this particular relationship is that, although for a flat image, the gradient magnitude value will be zero, the denominator of the fraction in equation (2) will never be zero and, therefore, the crispening parameter will never be undefined. Of course, although the relationship in equation (2) provides acceptable results, as explained in more detail below, it is well-understood that the invention is not restricted in scope to this relationship. Other relationships may also provide acceptable results. Furthermore, it may be that certain relationships provide better results for certain classes or categories of images or certain sets of image characteristics. Therefore, for those categories, or classes, for example, it may be desirable to employ a different relationship to compute-the crispening parameter, in this embodiment, alpha. FIG. 5 is a flowchart Illustrating a particular embodiment, such as previously described.

Of course, one aspect of this particular embodiment is computing the luminance value and the gradient magnitude value. Again, any one of a number of different techniques may be employed. However, in this particular embodiment, it is desirable to use a technique in which the luminance value is normalized, offsets are removed or reduced, and a weighted measure of luminance values is employed. In this particular embodiment, the measure of brightness is weighted by computing the mean luminance value of all or substantially all of the image pixels in the region being sharpened, although the invention is not limited in scope in this respect. Other weighted measures other than a mean value may be employed. Likewise, the measure is normalized in this particular embodiment by dividing by a value representing the range of luminance values for the image pixels or at least substantially all the image pixels in the region being sharpened. One approach would be to subtract the greatest luminance value from the smallest luminance value. However, an alternate approach is to compute a luminance value that has below it five percent of the luminance values over the particular region($L_5$), and a luminance value that has five percent of the luminance values above it ($L_{95}$), and subtract those values. An advantage of this alternative approach is that it reduces the risk that outlier luminance values will impact the calculation in a significant way. Again, the invention is not limited in scope in this respect and other approaches to normalizing may be employed. Likewise, in this particular embodiment, the offset of the measure is removed or reduced by subtracting $L_5$ from the mean value, although, if another weighted measure or normalization approach is employed then a different luminance value may be subtracted from that weighted measure. Therefore, in this particular embodiment, the luminance value for the region is computed substantially in accordance with the following relationship.

$$L(I)=(L_{mean}-L_5)/(L_{95}-L_5) \quad (3)$$

where, as previously indicated, these luminance values are computed over the entire region being sharpened or at least substantially all of the image pixels in the region being sharpened.

It is noted that a similar approach may be employed where the measure of the edges of the captured image or a portion of the captured image is the gradient magnitude, although the invention is not restricted in scope in this respect. Therefore, for this particular embodiment, $$E(I)=(G_{mean}-G_5)/(G_{95}-G_5), \quad (4)$$

where G is the gradient magnitude computed in accordance with the Prewitt operator, as previously indicated, for this particular embodiment.

Of course, once alpha is determined, then, the particular kernel may be applied to the captured image, or any portion thereof, using the adaptively computed crispening parameter, in this case, alpha. As previously indicated, this approach may be applied to any image, regardless of format or color space. For example, where the $YC_rC_b$ color space format is employed, the relationships above are applied to the luminance plane signal information. Likewise, once alpha is determined for a particular image, or portion thereof, the kernel is then applied, again, to the luminance plane signal information. This is because that plane contains all the non-color signal information for the image, and, therefore, processing the other planes is unnecessary. In contrast, if the RGB color space format is employed, then the relationships above may, in one embodiment, be applied to the green plane; however, once alpha is determined, then the kernel is applied to all three planes. This approach may be employed because the green plane contains enough luminance signal information to make the desired alpha determination; however, because the other planes also contain luminance signal information, sharpening is applied to those planes as well.

Figure 6:
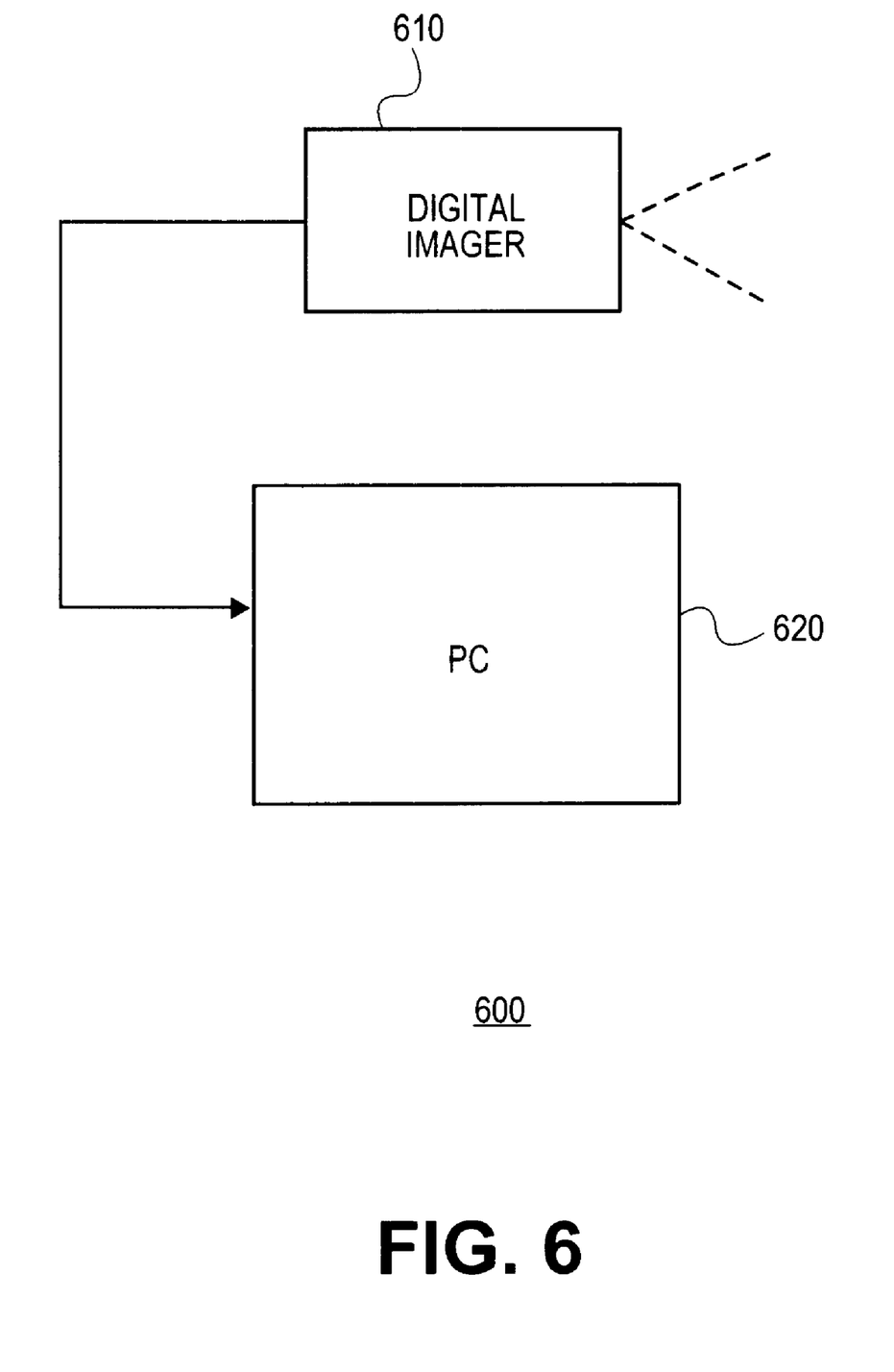
FIG. 6 is a schematic diagram illustrating an embodiment of a system that may employ an embodiment of a method of sharpening an image in accordance with the invention.

An aspect of the foregoing embodiments in accordance with the invention is the capability to automatically adjust the sharpening of an image or sequence of images based, at least in part, on the content of the image. This results in the sharpened images being more visually pleasing than if, for example, a fixed kernel were applied, or, if a non-fixed kernel were applied on a basis other than the content of the image being sharpened. It will, of course, be understood by one of ordinary skill in the art that an embodiment in accordance with the invention may be implemented in hardware, software, or a combination thereof. For example, FIG. 6 illustrates an embodiment including a digital imager coupled to a computing platform, here a personal computer, such as a desktop or laptop. In this embodiment, imager 610 includes hardware to apply an embodiment in accordance with the invention to a captured image. Of course, alternative embodiments may include software or a combination of hardware and software. In this embodiment, after processing, the signals are transferred to PC 620, typically for additional processing.

Figure 4:
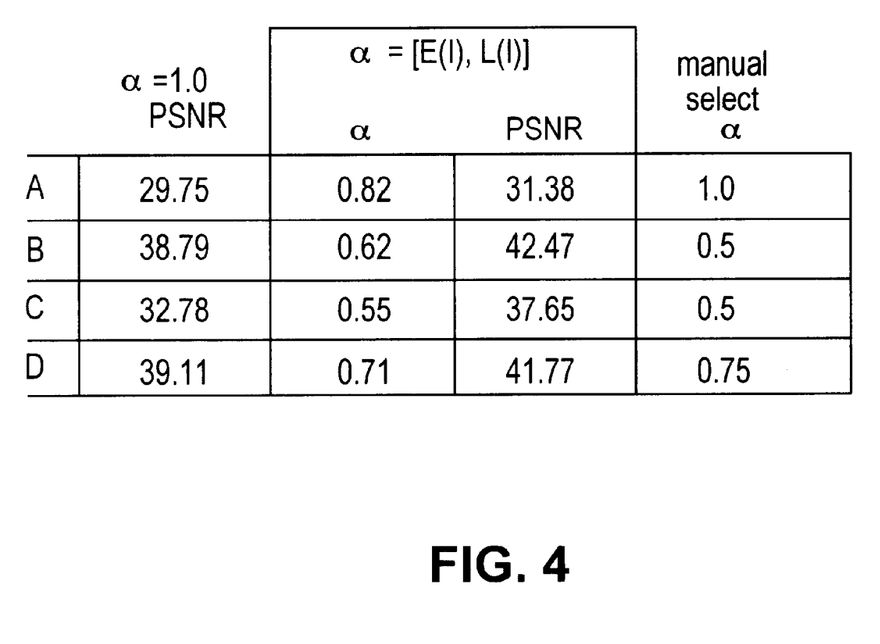
FIG. 4 is a table illustrating the results of applying an embodiment in accordance with the invention to several sample images.

FIG. 4 is a table illustrating the results of applying an embodiment in accordance with the present invention to several sample images. The first column provides the peak signal to noise ratio (PSNR) from applying a fixed kernel with alpha being one (1.0). PSNR is defined, for example, in the aforementioned text *Fundamentals of Digital Image Processing*. Column four provides the alpha that would be selected manually based on human judgement, where the step size for alpha is 0.25 and alpha is between zero and one inclusive. Columns two and three provide, respectively, the PSNR and alpha that would be computed if the embodiment in accordance with the invention previously described were applied, such as equations (1), (2), (3), and (4). As illustrated, the resulting alphas are reasonably close to those that result from using human judgement, and the resulting PSNR is better than the results from applying a fixed alpha.

While certain features of the invention have been illustrated as described herein, many modifications, substitutions, changes, and equivalents will now occur to those skill in the art. It is, therefore, to be understood that the appended claims are intended to cover all such modifications and changes as fall within the true spirit of the invention.

What is claimed is:

1. A method of sharpening an image comprising:
    adaptively computing a crispening parameter for at least a portion of a captured image based, at least in part, on a measure of the edges and the brightness of the at least a portion of the captured image, comprising:
    computing a luminance value for the at least a portion of the captured image;
    computing a gradient magnitude value for the at least a portion of the captured image; and
    computing the crispening parameter based, at least in part, on, approximately, the relative values of the computed luminance value and the computed gradient
    magnitude value; and
    applying a kernel to the at least a portion of the captured image using the adaptively computed crispening parameter.

2. The method of claim 1, wherein adaptively computing a crispening parameter for at least a portion of a captured image comprises adaptively computing a crispening parameter for at least a portion of a captured image based, at least in part, on a measure of the strength of the edges and the degree of brightness of the at least a portion of the captured image.

3. The method of claim 2, wherein the strength of the edges are measured using the gradient magnitude value for the pixels of the at least a portion of the captured image and the degree of brightness is measured using the luminance value for the pixels of the at least a portion of the captured image.

4. The method of claim 3, wherein computing the crispening parameter is based, at least in part, on, approximately, the relative values of the computed luminance value and the computed gradient magnitude value comprises computing the crispening parameter substantially in accordance with the following relationship:

$$\text{alpha}=L/[1+(6)^{1/2}E\,],$$

where alpha is the crispening parameter, L is the computed luminance value, and E is the computed gradient magnitude value.

5. The method of claim 3, wherein the computed luminance value comprises a normalized, offset reduced, weighted measure of the luminance values of at least substantially all the image pixels in the at least a portion of the captured image.

6. The method of claim 5, wherein the measure is weighted by computing the mean luminance value of at least substantially all of the image pixels in the at least a portion of the captured image.

7. The method of claim 5, wherein the measure is offset-reduced, from the mean luminance value, subtracting a luminance value that is greater than the 5 percent lowest luminance values of at least substantially all of the image pixels in the at least a portion of the captured image.

8. The method of claim 5, wherein the measure is normalized by dividing by a computed range of luminance values of at least substantially all of the image pixels of the at least a portion in the captured image.

9. The method of claim 8, wherein the computed range of luminance values is substantially in accordance with the following relationship:

$$range = L_{95} - L_5,$$

where $L_{95}$ is the luminance value smaller than 95 percent of the luminance values, and $L_5$ is the luminance value greater than 5 percent of the luminance values, of at least substantially all of the image pixels in the at least a portion of the captured image.

10. The method of claim 5, wherein the luminance value is computed substantially in accordance with the following relationship:

$$L = (L_{mean} - L_5)/(L_{95} - L_5)$$

where L is the luminance value for the at least a portion of the captured image, $L_{mean}$ is the mean luminance value of at least substantially all of the image pixels in the at least a portion of the captured image, $L_{95}$ is the luminance value smaller than 95 percent of the luminance values, and L5 is the luminance value greater than 5 percent of the luminance values, of at least substantially all of the image pixels in the at least a portion of the captured image.

11. The method of claim 3, wherein the computed gradient magnitude value for the at least a portion of the captured image comprises a normalized, offset reduced, weighted measure of the gradient magnitude values of at least substantially all the image pixels in the at least a portion of the captured image.

12. The method of claim 11, wherein the measure is weighted by computing the mean gradient magnitude value of at least substantially all of the image pixels in the at least a portion of the captured image.

13. The method of claim 12, wherein the measure is offset reduced by, from the mean gradient magnitude value, subtracting a gradient magnitude value greater than 5 percent of at least substantially of the image pixels in the at least a portion of the captured image.

14. The method of claim 11, wherein the measure is normalized by dividing by a computed range of gradient magnitude values of at least substantially all of the image pixels in the at least a portion of the captured image.

15. The method of claim 8, wherein the computed range of gradient magnitude values is substantially in accordance with the following relationship: range=$G_{95}-G_5$, where $G_{95}$ is the gradient magnitude value smaller than 95 percent of the gradient magnitude values, and $G_5$ is the gradient magnitude value greater than 5 percent of the gradient magnitude values, of at least substantially all of the image pixels in the at least a portion of the captured image.

16. The method of claim 11, wherein the gradient magnitude value is computed substantially in a accordance with the following relationship:

$$G = (G_{mean} - G_5)/(G_{95} - G_5)$$

where G is the gradient magnitude value for the at least a portion of the captured image, $G_{mean}$ is the mean gradient magnitude value of at least substantially all of the image pixels in the at least a portion of the captured image, $G_{95}$ is the gradient magnitude value smaller than 95 percent of the gradient magnitude values, and $G_5$ is the gradient magnitude value greater than 5 percent of the gradient magnitude values, of at least substantially all of the image pixels in the at least a portion of the captured image.

17. The method of claim 1, wherein the at least a portion of the captured image comprises an entire captured image.

18. An article comprising:

a storage medium;

said storage medium having stored thereon, instructions, that, when executed, result in the following:
adaptively computing a crispening parameter for at least a portion of a stored image based, at least in part, on a measure of the edges and the brightness of the at least a portion of the stored image, including:
computing a luminance value for the at least of portion of the stored image;
computing a gradient magnitude value for the at least a portion of the stored image; and
computing the crispening parameter based, at least in part, on, approximately, the relative values of the computed luminance value and the computed gradient magnitude value; and applying a kernel to the at least a portion of the stored image using the adaptively computed crispening parameter.

19. The article of claim 18, wherein the instructions, when executed, further result in adaptively computing a crispening parameter for at least a portion of a stored image based, at least in part, on a measure of the strength of the edges and the degree of brightness of the at least a portion of the stored image.

20. The article of claim 19, wherein the instructions, when executed, result in the strength of the edges being measured using the gradient magnitude value for the pixels of the at least a portion of the stored image and the degree of brightness being measured using the luminance value for the pixels of the at least a portion of the stored image.

21. The article of claim 20, wherein the instructions, when executed, result in computing the crispening parameter substantially in accordance with the following relationship:

$$alpha = L/[1+(6)^{1/2}E],$$

where alpha is the crispening parameter, L is the computed luminance value, and E is the computed gradient magnitude value.

22. The article of claim 20, wherein the computed luminance value comprises a normalized, offset reduced, weighted measure of the luminance values of at least substantially all the image pixels in the at least a portion of the stored image.

23. The article of claim 20, wherein the measure is weighted by computing the mean luminance value of at least substantially all of the image pixels in the at least a portion of the stored image.

24. The article of claim 22, wherein the measure is offset reduced by, from the mean luminance value, subtracting a luminance value that is greater than the 5 percent lowest luminance values of at least substantially all of the image pixels in the at least a portion of the stored image.

25. The article of claim 22, wherein the measure is normalized by dividing by a computed range of luminance values of at least substantially all of the image pixels of the at least a portion of the stored image.

26. The article of claim 18, wherein the at least a portion of the stored image comprises an entire stored image.

27. A system comprising:

a digital imager;

said digital imager including the capability to adaptively compute a crispening parameter for at least a portion of a captured image based, at least in part, on a measure of the edges, the brightness of at least a portion of the captured image, including a relative magnitude of a pixel luminance and a pixel gradient magnitude.

28. The system of claim 27, wherein said digital imager further includes the capability to apply a kernel to the at least a portion of the captured image using the adaptively computed crispening parameter.

29. The system of claim 27, and further comprising a computing platform coupled to the digital imager.

30. The system of claim 29, wherein the computing platform comprises a personal computer.

31. The system of claim 30, wherein the personal computer comprises one of a laptop and a desktop computer.

32. The system of claim 27, wherein the at least a portion of the captured image comprises an entire captured image.

* * * * *